United States Patent [19]

Krueger et al.

[11] 4,341,451
[45] Jul. 27, 1982

[54] CAMERA HAVING DEPTH OF FOCUS INDICATING MEANS

[75] Inventors: Roland Krueger, Wolfenbuettel; Joachim Proske, Brunswick; Ortwin Rösner, Munich; Walter Swarofsky, Brunswick, all of Fed. Rep. of Germany

[73] Assignee: Rollei-Werke Franke & Heidecke GmbH & Co. KG, Brunswick, Fed. Rep. of Germany

[21] Appl. No.: 251,122

[22] Filed: Apr. 6, 1981

[30] Foreign Application Priority Data

Apr. 5, 1980 [EP] European Pat. Off. ............ 80101837

[51] Int. Cl.³ .......................... G03B 3/08; G03B 17/20
[52] U.S. Cl. .................................... 354/289; 354/198
[58] Field of Search ............... 354/195, 196, 198, 289; 352/170, 171

[56] References Cited

U.S. PATENT DOCUMENTS 4,219,261  8/1980  Rosner et al. .................. 354/198 X

FOREIGN PATENT DOCUMENTS 329375   7/1975  Austria .
1185913  1/1965  Fed. Rep. of Germany .
1954391  6/1970  Fed. Rep. of Germany ...... 354/198
1918958  8/1979  Fed. Rep. of Germany .
2923443  1/1980  Fed. Rep. of Germany .

Primary Examiner—L. T. Hix
Assistant Examiner—William B. Perkey
Attorney, Agent, or Firm—Schwartz, Jeffery, Schwaab, Mack, Blumenthal & Koch

[57] ABSTRACT

A device for indicating the depth of field of a camera having aperture setting means and range setting means. The device comprises a plurality of optically active elements positioned for view in the camera viewfinder and scale means associated with the optically active elements. Means are also provided which are responsive to the camera aperture setting and the range setting to select adjacent ones of the optically active elements to indicate the depth of field.

16 Claims, 5 Drawing Figures

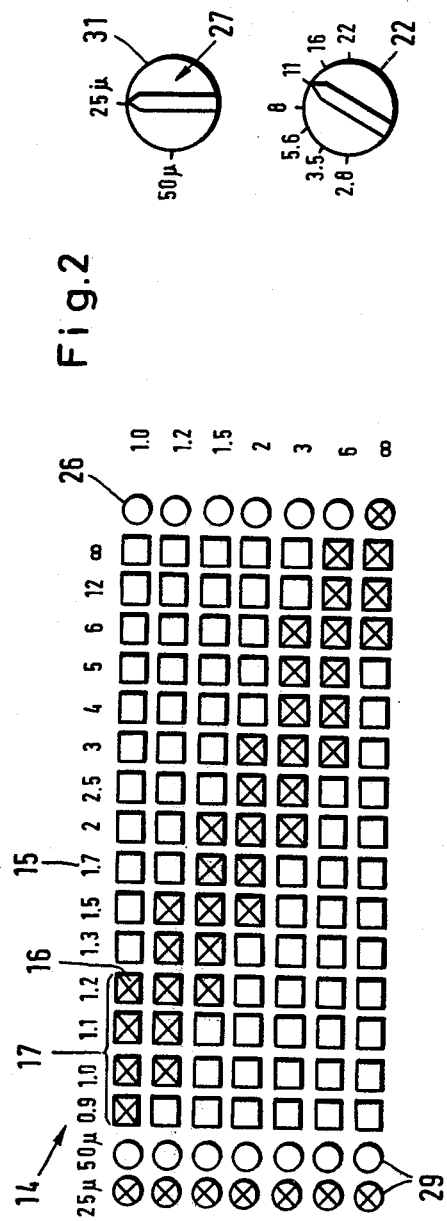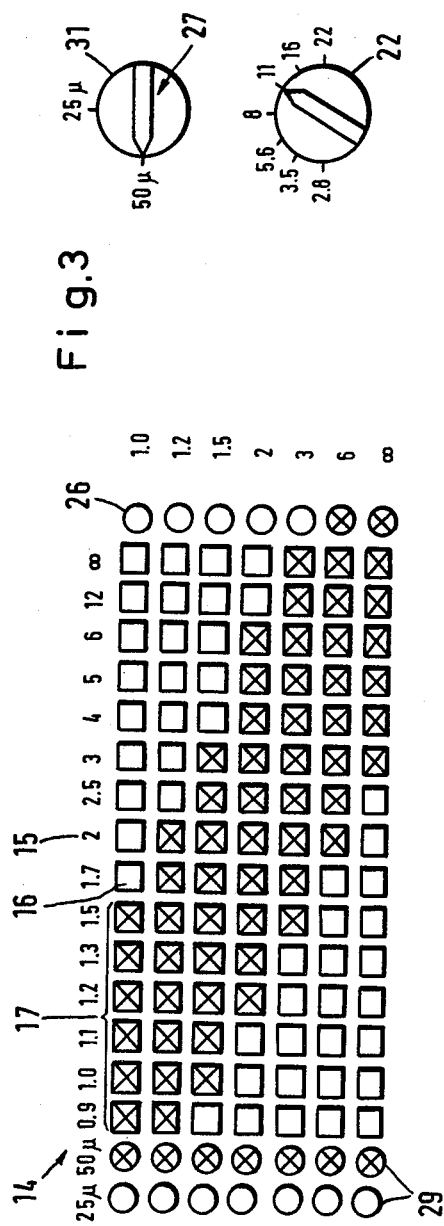

CAMERA HAVING DEPTH OF FOCUS INDICATING MEANS

BACKGROUND OF THE INVENTION

1. Field of the Invention

The invention relates to a camera having a device for indicating the depth of focus (depth of field).

2. Description of the Prior Art

In known cameras of this type, the distance scale visible in the viewfinder is movingly mounted by means of curved slits engaged by pins fixedly attached to the camera, and may be shifted with the range setter depending on the distance set. The two diaphragm lamella limiting the diaphragm aperture carry a masking flag, each made of a colored, transparent material and arranged in the viewfinder in front of the range scale. Depending on the aperture set, the mutual distance of the edges of the masking flags is smaller or larger. The masking flags thus display between themselves a variable range of the distance scale. This free range gives the aperture set, together with the range as adjusted.

Such a device for the indication of the focusing depth is expensive to construct in particular because of the parts moving within the viewfinder, such as the range scale and the masking flags, and above all requires a careful and accurate assembly operation. This translates into very high assembly costs, which for the most part find their way into the manufacturing cost of the camera.

SUMMARY OF THE INVENTION

It is the object of the invention to provide a camera with a device for the indication of the focusing depth, of the aforedescribed type, wherein the user, upon viewing the object, may immediately obtain an overview of the range of focusing depth available.

It is a further object of the invention to provide a focusing depth indicating device of a simple and readily assembled construction, which does not contain moving structural parts which complicate the assembly operation.

In accordance with the invention, the user, upon looking through the viewfinder, sees a luminous band on the range scale, which immediately provides an overview of the focusing range available. The length of the luminous band and its position on the range scale (for example, close to 0.9 m or near infinity) immediately indicates whether the available focusing range is small or large and in what order of magnitude of range it is located. By reading the range values found at both ends of the luminous band, the forward and rear range limits of the available focusing depth may be determined accurately.

The construction of the focusing depth indicating device according to the invention is simple and contains no moving element. The structural volume of a display line with the individual light emitting elements, such as for example light emitting diodes or liquid crystal cells is very low, so that the indicating device requires little space overall and may be readily integrated into the so-called compact cameras. Numerous modern day cameras contain electronic computers in the form of microprocessors. The full capacity of these microcomputers is not fully occupied by the camera functions, and thus, control of the focusing depth indicating device may be taken over by the microprocessor, so that aside from the additional luminous strip or luminous line, no further structural elements are required.

One form of embodiment is particularly suitable for cameras in which there are no microprocessors, and the function of controlling the individual display elements must be performed by a control circuit to be provided separately. In this embodiment, a particularly simple layout is set forth for the device for the indication of focusing depth. In addition to the display line of light emitting elements, an integrated circuit may be utilized which itself is inexpensive. The integrated circuit actuates one of its outputs as a function of the magnitude of its input voltage, thereby actuating the light emitting element connected with the output.

The sum voltage of the output potentials of an aperture setting and a range setting potentiometer is fed to the input of the integrated circuit. The output voltage of the transmitter of the actual value of the range is presented as a d.c. voltage and the output potential of the transmitter of the actual value of the aperture is presented as an a.c. voltage. By this arrangement, the luminous band characterizing the focusing range on the range scale is produced in a simple and effective manner. An alternating voltage of an amplitude proportional to the aperture number is superposed on the direct voltage characteristic of the range setting. Depending on the instantaneous magnitude of the sum voltage at the input of the integrated circuit module, one output after the other of the circuit module is actuated, and the light emitting element connected with the particular output is energized. By properly choosing a high frequency of the alternating voltage, the eye is not able to follow the rapid alternation of the lighting and extinction of the different light emitting elements, and for the user of the camera, a luminous band is generated. The position of the band on the range scale is determined by the direct voltage—as a function of the range set—and the length whereof by the magnitude of the alternating voltage amplitude at the output of the transmitter of the actual value of the aperture, as a function of the aperture set.

A particularly advantageous embodiment of the invention utilizes a condenser so that the d.c. potential of the actual range value transmitter is separated from the actual aperture value transmitter.

Another advantageous embodiment of the invention incorporates a focusing depth overflow indicating element which allows the user of the camera to optimally utilize the available focusing range. It is possible with the aid of this indication to effect a so-called "near setting to infinity". The user of the camera is merely required to rotate the range setter of the camera in the direction of shorter distances, until the focusing depth overflow display element is extinguished and the so-called focusing depth luminous band is extending up to the infinity range of the range scale. At this setting, the rear limit of the focusing range available is just located at infinity, and the forward limit of the focusing range has been shifted as close as possible to the camera.

In another embodiment of the invention, additional equipment for the focusing depth overflow display element consists merely of an additional light emitting element, for example a light emitting diode or a liquid crystal. If the aforedescribed, integrated circuit module is used, the display element is simply connected with the next successive outputs of the circuit module actuated by a slightly higher input potential than the output of the circuit module connected with the light emitting element marking the infinity indication on the range scale. If further unoccupied outlets are available on the integrated module that are actuated by increasing input potentials, these outputs are conveniently connected with the focusing depth overflow indicating element.

An especially advantageous embodiment of the invention utilizes a blur circle preselector which makes it possible for the user of the camera to choose between a high image quality—depending on the need to subsequently enlarge a negative—with the associated slight focusing range, and a lesser image quality with the associated larger focusing range. With a constant setting of the aperture and the range on the camera, the switching of the blur circle preselector from, for example 25μ to for example 50μ, extends the focusing depth luminous band on the range scale and indicates a substantially greater focusing range than otherwise available with the prevailing setting of the camera (aperture and range). The reduced image quality is made visible to the user by the blur circle display, for example by the lighting of a light emitting element associated with the blur circle value of 50μ.

BRIEF DESCRIPTION OF THE DRAWINGS

The invention is described with the aid of the drawings wherein:

FIGS. 2-5 show on an enlarged scale, a range scale with the associated light emitting elements, with a focusing depth overflow display element and a blur circle display, at different range settings and two selected aperture settings, and for two possible settings of a manual blur circle preselector.

DETAILED DESCRIPTION OF THE PREFERRED EMBODIMENTS

Figure 1:
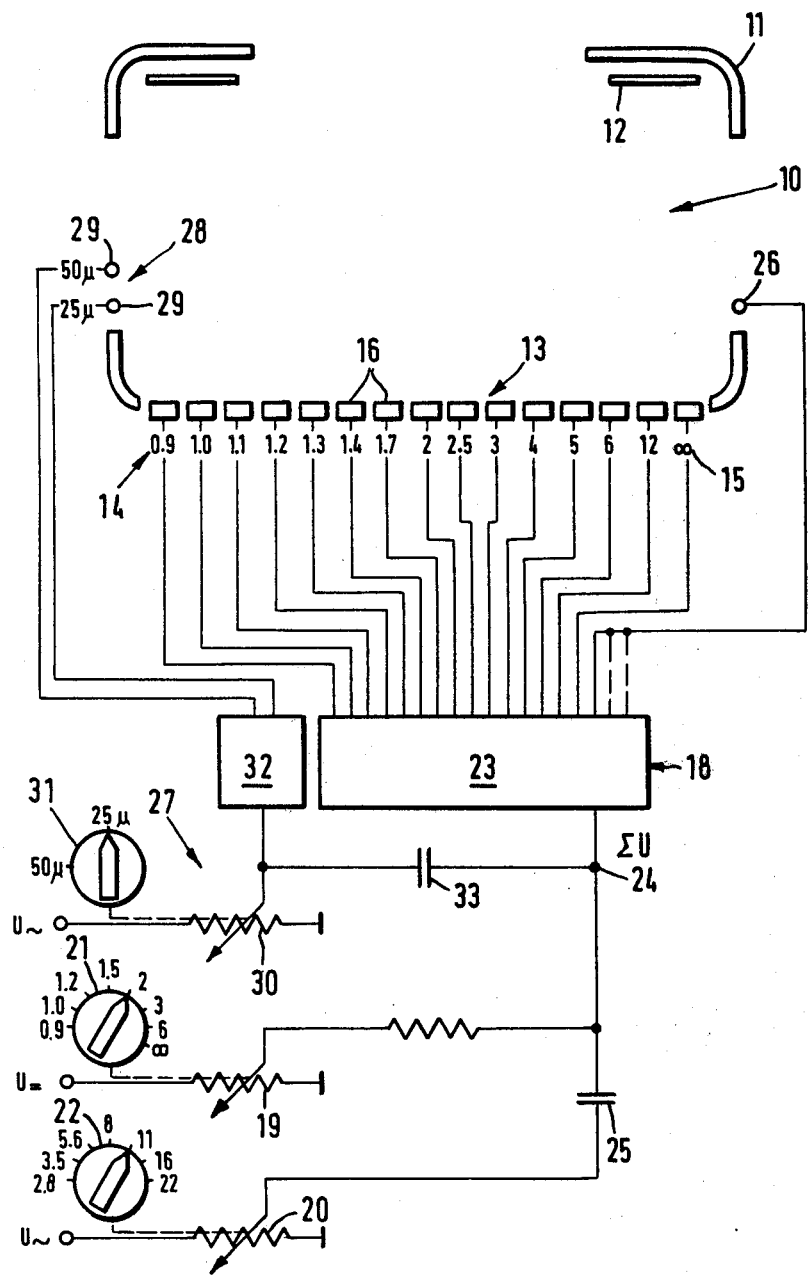
FIG. 1 is a viewfinder field of a camera with a circuit diagram for the indication of the focusing depth.

In the viewfinder field 10 shown in FIG. 1 of a viewfinder camera, 11 indicates a finder frame and 12 parallax marks. The camera has a focusing depth display device 13 for indicating the camera focusing depth. A range scale 14 of the focusing depth display device 13 is arranged in the view finder field 10 at the lower finder frame boundary. The range scale has scale values 15 ranging from 0.9 m to infinity. A light emitting element 16, i.e. an element emitting light upon actuation, is associated with each scale value 15. The light emitting element may, for example, consist of a light emitting diode or a liquid crystal cell. The light emitting element may more broadly be characterized as an optically active element which, in response to an electrical signal, changes its optical state. Thus, liquid crystal cells which merely change their light transmissive characteristics are included within the invention.

A scale segment corresponding to the focusing range, (the focusing depth range) is marked on the range scale 14. The focusing range is determined by the aperture and range set on the camera. This scale segment, designated 17 in FIGS. 2-5, is generated by the simultaneous or near simultaneous actuation of one or more of the light emitting diodes 16. Only the light emitting elements 16 arranged in the scale segment 17 corresponding to the focusing range are illuminated. The lighting of the light emitting elements 16 is indicated by a cross in FIGS. 2-5, so that the light emitting elements 16 identified by a cross indicate the scale segment 17.

The individual light emitting elements or diodes 16 are each connected with the outputs of an electronic computer 18. The inputs of the computer 18 are connected with actual value transmitters 19 and 20 corresponding respectively with the aperture and range settings of the camera. The range value transmitter 19 is mechanically coupled with the range setter 21, and the aperture value transmitter 20 is coupled with the aperture setter 22. The actual value transmitters 19, 20 consist, in their simplest form, of sliding potentiometers or variable resistors.

The electronic computer 18 may consist of a microprocessor which often performs the control functions for modern cameras. Typically, a camera microprocessor is not completely occupied or busy by the camera functions to be controlled, and thus the actuation of the focusing depth display device 13 may be advantageously effected by such a microprocessor. Only the light emitting diodes 16 are then required as additional structural elements for the focusing depth display device 13.

In the present embodiment of the invention, suitable in particular for cameras without existing microprocessors, the electronic computer 18 has an integrated circuit module 23, which as a function of the magnitude of its input voltage, actuates one of its outputs connected with the light emitting diodes 19. Such an integrated circuit module 23 may be, for example, Model No. UAA 170 developed specifically for the actuation of 16-position light emitting diode scales. The National Semiconductor Company also markets such an integrated circuit module 23 as their Model No. LM 3914. The input 24 of the circuit module 23 is connected with the voltage tap of the potentiometer of the range value transmitter 19 and, through a condenser 25, with the voltage tap of the potentiometer of the aperture value transmitter 20. The range value transmitter 19 is connected with a direct voltage, while the aperture transmitter 20 is connected with an alternating voltage. The voltage taps of the two potentiometers 19, 20 are displaced, so that a voltage corresponding to the existing range or aperture settings is generated. At the range transmitter 19 a direct voltage is produced, and at the aperture transmitter 20 an alternating voltage is produced. The sum of the direct and alternating voltages is applied to the input 24 of the integrated circuit module 23.

If, as shown in FIG. 1, the range setter is set for a range of 2 m, the range value transmitter 19 will transmit a direct voltage that represents this range setting of 2 m. This voltage is applied, while neglecting at this time the alternating voltage from the aperture value transmitter 20, to the input 24 of the circuit module 23. In keeping with the magnitude of this input voltage, the output of the module 23 generates an activation signal which is fed to one of the light emitting diodes 16 associated with the scale value of 2 m on the range scale 14. The aperture setter 22 is now on the setting k=11. The voltage tap of the aperture value transmitter 20 is thereby moved into a definite position. At the voltage tap, an alternating potential is generated which has an amplitude that is characteristic for the aperture setting of k=11. This alternating voltage is superposed on the direct voltage on the input 24 of the circuit module 23. There a voltage is provided on the input 24 of the module 23, which is constantly alternating between a lower and a higher value. Consequently, a certain number of outputs of the module 23 are activated constantly and successively, causing the corresponding light emitting diodes 16 to light up. As seen in FIG. 2 for the range setting of 2 m, the magnitude of the voltage applied to the input 24 of the circuit module 23 causes activation of light emitting diodes 16, that are characteristic of the ranges of 1.5 m, 1.7 m, 2 m, 2.5 m and 3 m. With a sufficiently high frequency of the alternating voltage, the human eye is not capable of following the successive actuation and extinction of the light emitting diodes 16, and the viewer perceives a luminous band extending from a scale value of 1.5 m to a value of 3 m. In this manner, the focusing range available at a range setting of 2 m and the aperture setting of k=11 is indicated to the user, with a forward limiting range of 1.5 m and a rear limiting range of 3 m.

Figure 4:
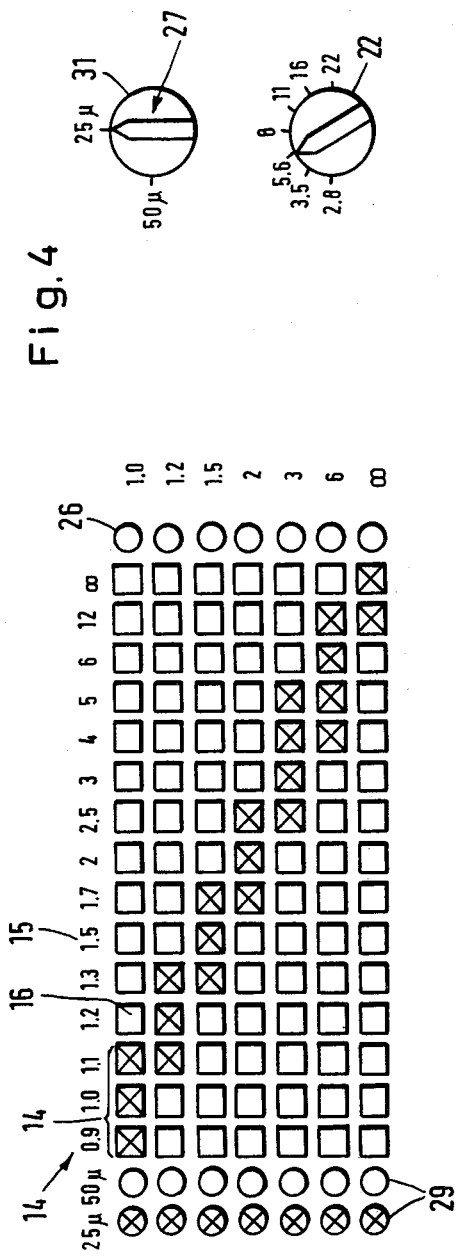

FIG. 2 demonstrates the manner wherein the scale segment 17, marking the focusing range, is displaced when the range setter 21 is shifted from a range setting of 1.0 m to the range setting of infinity. The same occurrence is shown in FIG. 4, for an aperture of K=5.6 set by means of the aperture setter 22.

The focusing depth display device 13 further has a focusing depth overflow display element 26, which is arranged in the view finder field 10. The focusing depth overflow display element 26 may also be a light emitting element, for example a light emitting diode or a liquid crystal cell. This focusing depth overflow display element 26 becomes visible whenever the focusing range determined on the basis of the range and aperture settings extends beyond the infinite range. This is effected in a simple manner by tying the extreme output line or lines of the circuit module 23, which occur after the output line connected with the infinite light emitting diode 16, with the focusing depth overflow element 26. If further unoccupied outputs with higher threshold potentials are available on the circuit module 23, all of these outlets are also connected with the focusing depth overflow display element 26, as indicated by the broken line in FIG. 1. The focusing depth overflow display element 26 lights up whenever one of these outlets is actuated.

Figure 5:
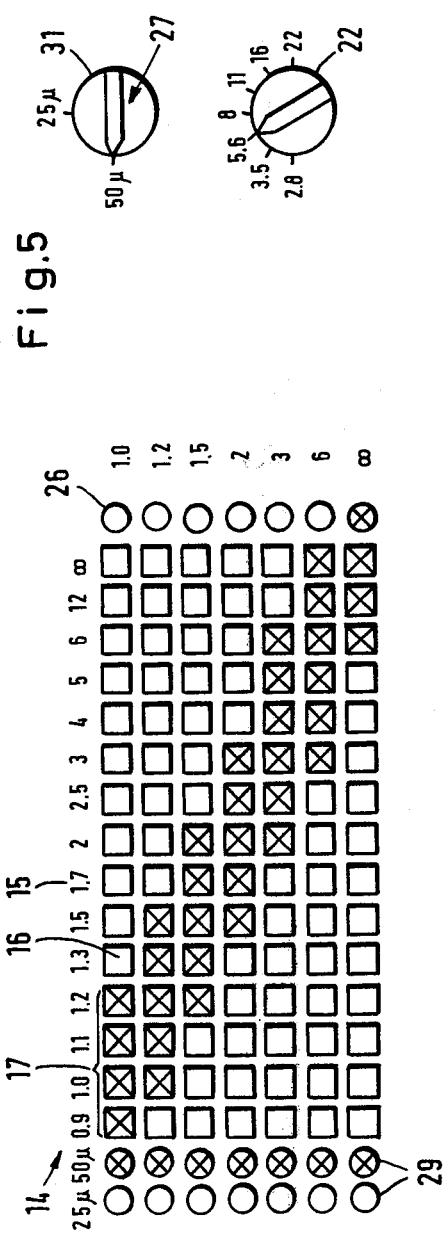

The mode of functioning of the focusing depth overflow display element 26 may be explained best with the aid of FIGS. 2, 3 and 5. If, for example, in FIG. 2 the range setter 21 is set at a range of 6 m, the light emitting diodes 16 marked by a cross in the last but one line are energized, and the focusing range is located between a forward limit of 3 m and a rear limit of infinity. If now the user sets the range setter 21 at a distance of infinity, the focusing depth overflows, i.e., the forward limiting value of the focusing range is now at 6 m, while the rear limit, which already had been at infinity, remains constant. The focusing range is thus reduced, without providing any advantage for the exposure.

In this case, as indicated by the symbol of the cross in the last line of FIG. 2, the focusing depth overflow display element 26 lights up and indicates to the user that the infinite range has been exceeded. This signal makes it possible for the user to effect a "near setting to infinity", i.e., to shift the forward limit of the focusing range as close as possible to the camera, without taking away the rear limit of infinity. It is merely necessary for the user to rotate the range setter 21 in the direction of a lower range, until the focusing depth overflow display element is extinguished. This—as seen in FIG. 2—occurs when the range setter 21 again stands at 6 m. It is thus possible for the user to make optimum use of the focusing depth available near the infinite range.

It should be noted that the focusing depth overflow display element 26 may be provided separately from the aforedescribed luminous band indication of the focusing range. It may also be used in combination with known focusing depth display devices. The combination of the focusing depth overflow display element 26 with the abovedescribed embodiment of the focusing depth display element 13 is, however, especially appropriate, because here the user is able to observe accurately in the viewfinder whether the rear limit of the focusing range is exactly the infinite range and whether an overflow has taken place.

The camera is further provided with a blur circle preselector 27. The preselector 27 is actuated manually and serves to feed in a blur circle upon which may be used to determine the focusing range. To indicate the blur circle set by means of the preselector 27, for example $25\mu$, a blur circle indicator 28 is arranged in the viewfinder field 10. This indicator 28 has two light emitting elements, for example light emitting diodes 29 or liquid crystal cells, which are actuated alternatingly, corresponding with the setting of the preselector 27. Each light emitting diode 29 is associated with a symbol "$25\mu$" or "$50\mu$", visible to the user.

This blur circle preselector 27 makes it possible for the user to choose between a high image quality with the feasibility of a high subsequent enlargement of the negative, while accepting a small focusing range, and a somewhat poorer image quality, while obtaining a larger focusing range. This may be demonstrated best with the aid of FIGS. 2 and 3. The setting of the aperture setter 22 in FIG. 2 and 3 is unchanged. In FIG. 2, the blur circle preselector is set at $25\mu$, while in FIG. 3 it is on $50\mu$. When the range setter 21 is set, for example to a range of 2 m, with a blur circle diameter of $25\mu$ (FIG. 2), a focusing range of 1.5 m to 3 m is obtained. With an identical range setting of 2 m, the setting of the blur circle preselector 27 at $50\mu$ (FIG. 3) yields a focusing depth of 1.2 m to 6 m, i.e., significantly larger. The user, therefore, has a larger focusing range in the second case, but is informed by the energization of the light emitting diode 29 for the blur circle of $50\mu$, that a slightly lesser image quality is being obtained, which will not permit a strong enlargement of the negative.

The present embodiment of the invention may contain a blur circle preselector 27 consisting of a potentiometer 30, having a voltage tap mechanically coupled with the setting knob 31 of the preselector 27. The potentiometer 30 may be a two-stage potentiometer, permitting merely the setting of two voltage values, corresponding to the positions of the setting knob 31 at $25\mu$ or $50\mu$. If, as described above, the electronic computer 18 utilizes the integrated circuit module 23, it is possible to connect the potentiometer 30 with a source of alternating voltage, and to connect the voltage tap to the input 24 of the circuit module 23. The voltage tap is additionally connected with a voltage detector 32, which is response to the effective or average value of the alternating voltage from the potentiometer 30 actuates one or the other of the two light emitting diodes 29. For example, with a setting of the setting knob 31 to $25\mu$, a voltage of 0 V may be taken off the potentiometer 30, so that the conditions are as described hereinabove and a scale segment corresponding to the available focusing range, depending on the settings of the aperture and the range, is lit up on the range scale (FIG. 2 and 4). If now the setting knob 31 is switched to $50\mu$, a further alternating voltage is added to the sum voltage at the inlet 24 of the circuit module 23. This additional voltage is in phase with the alternating voltage taken from the aperture value transmitter 20. Here again, it is convenient to arrange a condenser 33 between the voltage tap of the potentiometer 30 and the input 24 of the module 23. The additional alternating voltage increases the amplitude of the alternating voltage superposed on the direct voltage representing the distance set, and correspondingly extends the scale segment 17 indicating the focusing range (FIGS. 3 and 5).

It should be noted here again, that the aforedescribed blur circle preselector 27 with the blur circle indicator 28, may function independently of the abovedescribed focusing depth indicating device 13 and from the focusing depth overflow display element 26. It may be combined with different focusing depth indicating devices, without being deprived of its advantageous properties. In a manner similar to that of the aforedescribed focusing depth overflow display element, the blur circle preselector 27 with the blur circle indicator 28 is most advantageous in providing the user with an instantaneous overview of the focusing range.

The invention is not restricted to the abovedescribed finder camera. It is suitable in an equally advantageous manner for a mirror reflex camera, for which the aforedescribed embodiment is equally valid, with the single difference that in the finder field 10 the parallax marks 12 are eliminated and a sharp focusing aid, for example a ground glass with a micrograting is brought into view.

What is claimed is:

1. A device for indicating the depth of field of a camera having aperture setting means and range setting means comprising:
   (a) a plurality of optically active elements positioned for view in the camera viewfinder;
   (b) scale means associated with said optically active elements,
   (c) said aperture setting means including means for producing an A.C. voltage for a given value of aperture setting,
   (d) said range setting means including means for producing a D.C. voltage for a given value of range setting, and
   (e) means for energizing selected adjacent ones of said optically active elements to indicate a depth of field, said energizing means responsive to said A.C. voltage and said D.C. voltage.

2. A device as recited in claim 1, wherein said energizing means comprises a microprocessor.

3. A device as recited in claim 2, wherein said microprocessor has an input terminal connected to receive both said A.C. voltage and said D.C. voltage.

4. A device as recited in claim 3 further including a condenser connected between said aperture setting means and said input terminal of said microprocessor.

5. A device as recited in claim 1 further comprising an overflow indicator, and said means for energizing further includes means for displaying said overflow indicator when the depth of field to be indicated by said optically active elements exceeds the upper limit of the scale means.

6. A device as recited in claim 5, wherein said overflow indicator comprises an optically active element.

7. A device as recited in claim 6, wherein said energizing means comprises a microprocessor.

8. A device as recited in claims 1 or 6, wherein said optically active elements comprise light emitting diodes.

9. A device as recited in claims 1 or 6, wherein said optically active elements comprise liquid crystal displays.

10. A device as recited in claim 5, wherein said overflow indicator is positioned for view in said camera viewfinder.

11. A device as recited in claims 1 or 5 further comprising a blur circle preselector, said energizing means responsive to the setting of said blur circle preselector for indicating said depth of field.

12. A device as recited in claim 11, wherein said blur circle preselector comprises means for providing a range of input voltages to said energizing means for a given value of said blur circle preselector.

13. A device as recited in claim 12 further comprising optically active elements corresponding to settings of said blur circle preselector for indicating same, said blur circle preselector optically active elements energized by said energizing means.

14. A device as recited in claim 13, wherein said optically active elements comprise light emitting diodes.

15. A device as recited in claim 13, wherein said optically active elements comprise liquid crystal displays.

16. A device as recited in claim 13, wherein said blur circle optically active elements are positioned for view in said camera viewfinder.

* * * * *